F. J. CHAPSAL & A. L. E. SAILLOT.
PISTON WITH TWO CUPPED LEATHERS.
APPLICATION FILED MAR. 26, 1914.
1,153,604.
Patented Sept. 14, 1915.
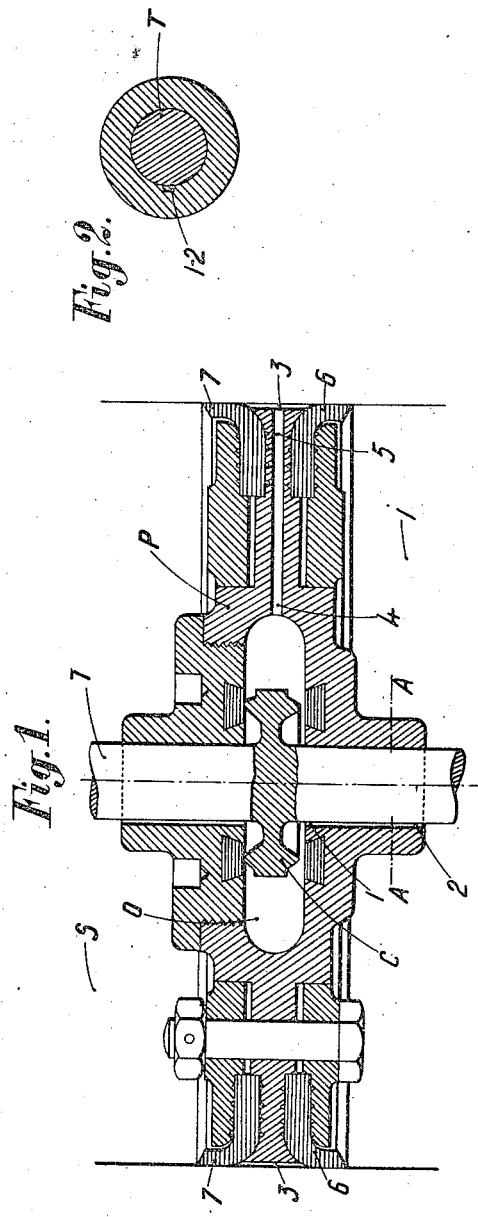

UNITED STATES PATENT OFFICE.

FRANÇOIS JULES CHAPSAL, OF PARIS, AND ALFRED LOUIS EMILE SAILLOT, OF LA GARENNE-COLOMBES, FRANCE.

PISTON WITH TWO CUPPED LEATHERS.

1,153,604.   Specification of Letters Patent.   Patented Sept. 14, 1915.

Application filed March 26, 1914. Serial No. 827,597.

*To all whom it may concern:*

Be it known that we, FRANÇOIS JULES CHAPSAL and ALFRED LOUIS EMILE SAILLOT, citizens of the French Republic, residing at Paris and at La Garenne-Colombes, Department of the Seine, in France, have invented certain new and useful Improvements in Pistons with Two Cupped Leathers; and we do hereby declare the following to be a full, clear, and exact description of the invention, such as will enable others skilled in the art to which it appertains to make and use the same.

This invention has for its object a piston actuated by fluid pressure and which is packed by means of two cupped leathers arranged in opposite directions. These leathers are arranged in such a manner that throughout the entire travel and no matter in what direction it may be, the circular chamber comprised between the two cupped leathers and the body of the cylinder in which they move, is at all times maintained at such a pressure that the resistance of the piston provided with these two cupped leathers is not greater than that of a piston comprising but a single cupped leather.

This novel type of piston is applicable to the control of fluid pressure distributing members and also to the control members of compressed air brakes with auxiliary reservoir whose complete adjustability both in applying and in releasing the brakes is obtained by means of a re-charging reservoir by the action of the distributer and in which the member controlling the slide valve should therefore be highly sensitive in both directions which necessitates the formation of perfect joints in this apparatus.

In the accompanying drawing: Figure 1 is a longitudinal section of a control piston P in accordance with the invention assembled in a non-rigid manner with its rod T and represented at the moment at which this piston is about to displace this rod as a result of a diminution of pressure produced in the lower chamber I connected with the train pipe. Fig. 2 is a section on the line A—A in Fig. 1. Fig. 3 illustrates a modified form of a control piston in accordance with the invention, but rigidly assembled with its rod.

The main characteristic of the control piston in accordance with the invention represented in Figs. 1 and 2 consists in dispensing with a rigid connection between this piston and its rod T, and in the utilization in any appropriate manner of a method of driving this rod such that at the moment at which the rod T is displaced, after a slight displacement of the piston P, that one of the two air chambers acting upon the piston in which the pressure is higher is automatically cut off from the inner body of the piston, while the chamber in which the pressure in becoming smaller has produced the movement of the piston, is placed in communication with the interior of the piston and with the circular chamber comprised between the two cupped leathers and the cylinder in which the piston moves; this communication is maintained until a variation in the opposite sense of the relative pressures of the air in these two chambers produces the movement of the piston P in the opposite direction whereby the chamber previously connected with the body of the piston is cut off therefrom, while communication between the body of the piston and the chamber previously cut off from it, is established.

In Fig. 1, S is the upper chamber connected with the auxiliary reservoir and in the position of the piston shown in the drawing the lower face of its upper plate after being slightly displaced has come to rest upon the double valve C rigid with the rod T upon which it forms a joint thus cutting off communication between the chamber S and the interior O of the body of the piston while communication between the latter and the lower chamber I is established by the small channel 1—2 and the double valve C separated from the inner face of the lower plate, so that the circular chamber 3 comprised between the two cupped leathers 6 and 7 is also placed in communication through the channel 4—5 with the chamber I connected with the train pipe. It follows that throughout the entire downward stroke of the piston P, the pressure on the two faces of the lower cupped leather 6 is equal to the pressure in the lower chamber I, while the pressure which causes the upper cupped leather 7 to bear upon the cylindrical body in which it is displaced, is at all times equal to the difference of the pressures in the chambers S and I. The resistance of this piston comprising two cupped leathers to displacement is therefore equal in these conditions and throughout its entire stroke to the resistance, of a piston with a single cupped leather and this condition of affairs obtains until a modification in the inverse sense of the relative pressures of the air in the two chambers S and I produces the movement in the opposite direction of the piston P which then cuts off the lower chamber I (previously connected with the inner body O of the piston) while it establishes communication with the body of the piston and with the circular chamber comprised between the two cupped leathers and the chamber S which was cut off from them. The resistance of this double cupped leather piston is therefore equal throughout its entire travel and no matter in what direction the travel may be to the resistance of a piston comprising a single cupped leather. In the modification represented in Fig. 3 the rigidity of the assemblage of the piston and of its rod is maintained, but the supply to the circular air chamber 3 comprised between the two cupped leathers 6 and 7 is then furnished solely by the train pipe G. With this object the two cupped leathers are assembled at a sufficient interval to insure that the small orifice 8 through which air penetrates from the train pipe into the circular chamber 3 shall always be comprised between the two leathers whatever the position of the piston may be. Upon the branch connecting this small orifice 8 with the train pipe G a non-return valve 9 is arranged; this valve is loaded by a spring 10 adjusted in such a manner as to balance a pressure of approximately 0.100 of a kilogram per square cm. acting upon the valve.

When the train pipe is charged, the upper chamber S and lower chamber I are fed directly and at the same pressure as the train pipe, but with a slight retardation as regards the upper chamber, so that the piston is displaced to the end of its upward stroke while the circular chamber 3 comprised between the two cupped leathers is charged at the same time, but at a pressure less than 0.100 of a kilogram per square cm.

If a reduction of pressure in the train pipe and consequently in the chamber I produces the depression of the piston P with the object of applying the brakes, the non-return valve 9 remains closed and the circular chamber remains cut off so long as the reduction of pressure in the train pipe G is less than 0.100 of a kilogram, but as soon as this reduction of pressure exceeds this value, the pressure in the circular chamber 3 is equal at all times to the pressure in the train pipe, because there is a continuous decantation of air from this chamber into the chamber I around the cupped leather acted upon at the rear. The resistance opposed by the piston to the movement of descent is then reduced to that of the upper cupped leather 7 applied against the cylindrical body in which it moves by a pressure equal to the difference of the pressures in the chambers S and I, that is to say to the diminution of pressure in the train pipe. This resistance is therefore the same as that of a piston with a single cupped leather. When, owing to the operation of the distributing slide valve, the pressure of the air in the upper chamber S which is then connected with the brake cylinder has become slightly lower than that in the lower chamber I and in the circular chamber 3, the equilibrium of pressure of the air in the chambers S and I is constantly established by the cupped leather 7 acted upon at the rear by the air of the chamber 3, while the piston P ascends until the moment at which the upper edge of the slide valve cuts off the admission of air to the brake cylinder. During this upward stroke the resistance of the cupped leather 7 is therefore *nil* and the resistance of the piston is reduced to that of the cupped leather 6 which is applied to the cylindrical body in which it moves by a pressure equal to the difference of the pressures of the chambers I and 3, that is to say of the chambers I and S.

During the graduation of the application of the brake, the resistance of the piston with two cupped leathers whose circular chamber is supplied from the train pipe in the conditions indicated above, is therefore reduced in both directions to the resistance of a piston with a single leather.

If after one or more applications of the brakes the train pipe is re-charged with the object of partially or wholly taking off the brakes, the lower chamber S which had remained at a pressure slightly less than that of the chamber I, is still cut off from the train pipe by the distributer, while the circular chamber 3 at the same pressure as the chamber S is first of all cut off by the non-return valve 9 loaded by the spring adjusted for a pressure of 0.100 kilograms per square cm., so that the piston P ascends to the top of its stroke and consequently the distributing slide valve opens the orifice for the exhaust of the air from the brake cylinder and the communication port between the recharging reservoir and the upper chamber S whose pressure increases until it becomes slightly greater than the pressure in the chamber I connected with the train pipe G. The piston P then descends until the orifice of the lower edge of the slide valve cuts off communication between the recharging reservoir and the upper chamber S whose final pressure at each partial release of the brakes, is slightly greater than that of the chamber I. The same conditions obtain at each partial recharging until the final release of the brakes when equilibrium of the pressure in the chambers I and S is established by the distributer, the piston being pressed back to the end of its stroke owing to the more rapid re-charging of the lower chamber I.

We claim:

1. The combination with a fluid pressure cylinder, of a piston mounted therein having two cupped piston rings turned outwardly toward the ends of the cylinder and forming with the walls of the cylinder and piston an annular chamber, and means operable for each stroke of the piston to equalize the pressure in said chamber with the pressure in that end of the cylinder toward which the piston is moving to reduce the friction of that piston ring which is curved or turned toward such end of the cylinder.

2. The combination with a fluid pressure cylinder, of a piston mounted therein having two cupped flexible piston rings turned outwardly toward the ends of the cylinder, and means operable for each stroke of the piston to reduce the friction of that piston ring which is turned toward the end of the cylinder being approached by the piston.

In testimony whereof we affix our signatures, in presence of two witnesses.

FRANÇOIS JULES CHAPSAL.
ALFRED LOUIS EMILE SAILLOT.

Witnesses:
  CHAS. P. PRESSLY,
  ERNST KLOK.